June 26, 1956
A. SELIGMAN
2,751,929
VALVE FOR RECIPROCATING COMPRESSORS
Filed Sept. 30, 1953
2 Sheets-Sheet 1
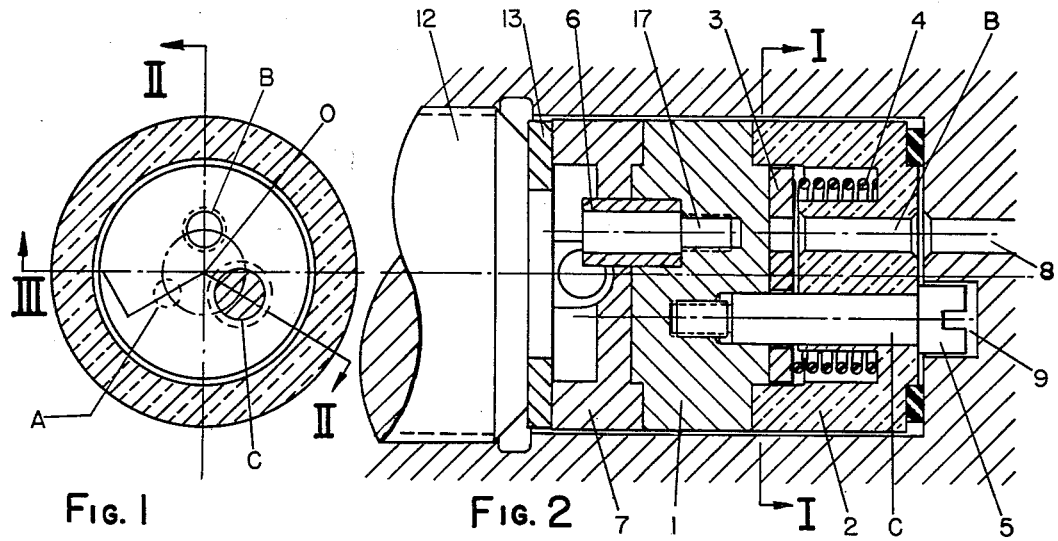
Fig. 1
Fig. 2
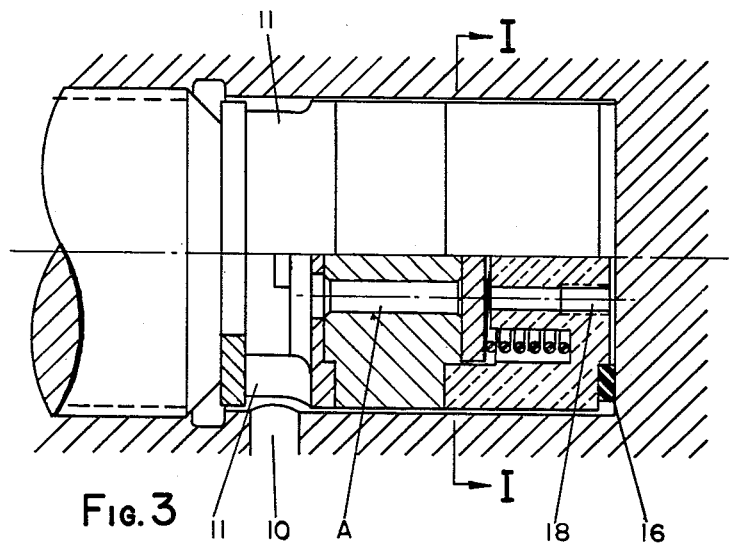
Fig. 3
INVENTOR.
Arthur Seligman June 26, 1956 A. SELIGMAN 2,751,929
VALVE FOR RECIPROCATING COMPRESSORS
Filed Sept. 30, 1953 2 Sheets-Sheet 2

INVENTOR.
Arthur Seligman

2,751,929
VALVE FOR RECIPROCATING COMPRESSORS

Arthur Seligman, Erie, Pa.

Application September 30, 1953, Serial No. 383,305

9 Claims. (Cl. 137—540)

This invention relates to automatic compressor valves. Its main purpose is to provide a reliable, sturdy, easily manufactured, and at the same time efficient valve, particularly for high frequency, high pressure, and small size; regarding size, however, it must be borne in mind that the gas volume handled, and thus the required displacement, in the higher stages of multistage compressors is small even in larger machines.

Figure 5:
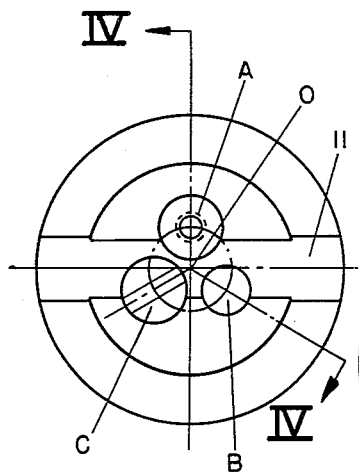
Figure 4:
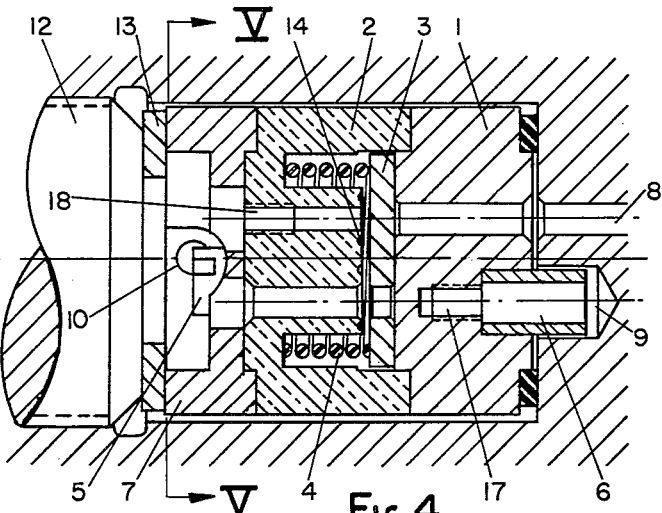
Figure 6:
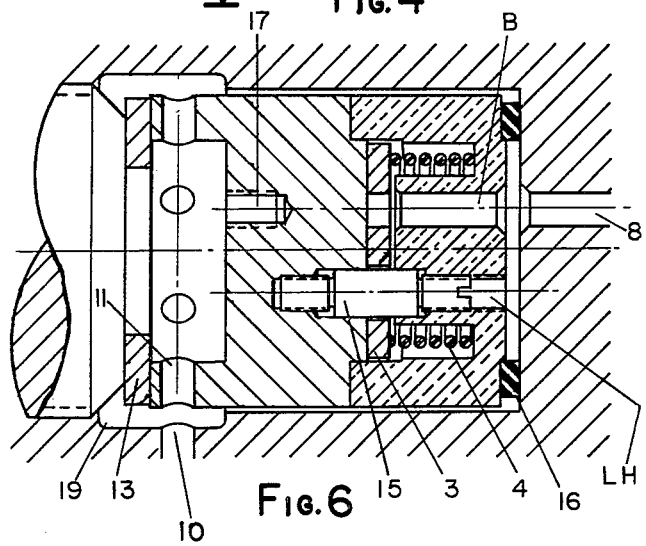

Fig. 1 is a transversal section through an inventional valve along lines I—I of Figs. 2 and 3; Fig. 2 is a longitudinal section through a valve as installed in the compressor, taken along line II—O—II of Fig. 1; the lower half of Fig. 3 is a section along the zig-zag line III—O of Fig. 1, the upper half an elevation; these three figures show a suction valve. Fig. 4 is a longitudinal section along IV—O—IV of Fig. 5 of a discharge valve as installed, while Fig. 5 is a plan view of the same valve, looking from the outside towards the cylinder upon the plane V—V of Fig. 4; Fig. 6 shows a variation of a suction valve in longitudinal section.

The valve consists essentially of the seat 1, the guard 2, the plate 3, the spring 4, the bolt 5, and it may have a dowel pin 6 and an adapter 7. Seat, plate, guard, and adapter, if any, are essentially right circular cylinders and they have certain holes drilled in them, parallel to the valve axis, of approximately equal size, preferably arranged on a common pitch circle and spaced at 120° to each other. The seat and the guard fit to each other on a peripheral shoulder, the seat forming preferably the male and the guard the female part, which facilitates grinding the working surface of the seat. The plate fits slidingly into the hollow cylinder formed between seat and guard and can move in axial direction; it is urged towards the seat by the spring, which is located in a well within the guard; a cylindrical helical spring, as shown, is the preferred construction, however other shapes are possible. As can be seen, the seat has a hole A going through it in axial direction, which serves as channel for the passage of the gas. The plate has no hole opposite A, thus when the plate is in the position shown, contact the seat, urged towards it by the spring and held to it by the gas pressure, the opening is closed and no gas can pass through the valve. The plate does, however, have a hole B through it, preferably on the same pitch circle with, but 120° offset from A, and the guard also has a through hole registering with said hole B; thus, when the gas pressure on the inlet side (that is on the left side of Figs. 2, 3, and 6, and on the right side in Fig. 4) prevails and lifts the plate off the seat against the spring load, the gas can pass from A between seat and plate and through B, in other words, the valve is open. Each of the three parts, seat, plate and guard, have another hole C, 120° offset against A as well as B; these C-holes are drilled all the way through guard and plate, but not through the seat; in the latter the C-hole is "blind" and provided with an internal thread. As can be seen, the bolt when properly inserted into the C-holes holds all parts together and keeps them in proper alignment. The gas, emerging from the B-hole of the guard, enters the compressor cylinder through the port 8; to insure proper installation of the valve a hole 9 which may be blind, is provided in the cylinder body, offset from port 8 by 120° so as to be situated at location "C"; when the valve is installed the head of the bolt must be introduced into this hole 9, and this will align the B-hole in the guard properly with porthole 8. The seat may have another blind hole, drilled from the outside, preferably at B-location, into which the dowel pin 6 is inserted. The adapter 7 has three axial holes at 120° of each other; when used on the suction side (Figs. 2 and 3), then the one at A serves for gas passage, that at B for alignment by mating with the dowel pin; whereas when used on the discharge side (Fig. 4), then B serves for gas passage and C for alignment by receiving the head of the bolt; the radial slots or holes 11 on the outer rim of the adapter are, of course, so located that one of them registers with the port 10 in the cylinder body.

The valve is held in place by suitable means, e. g. the hold-down screw 12; a washer 13 with smoothly finished surfaces may be put between this screw and the adapter to avoid transmission of torque, and consequently shear stress on dowel and bolt, when the hold-down screw is tightened. The gasket 16 makes a gas tight seal between cylinder and valve. The tap 17 may be provided into which a lifting hook may temporarily be screwed to facilitate installation and removal of the valve.

A similar construction may be used for the discharge valve; as a matter of fact, in most cases "reversible" valves, that is completely identical for suction and discharge, can be used; this is shown in Figs. 4 and 5, where the same valve is applied as discharge valve that is shown as suction valve in Figs. 1 to 3, with the only exception that a slightly heavier spring is provided, which is often commendable. With respect to the compressor the valve is just turned around. Tap 18 is for the lift-out hook, and is preferably at (A) location. No further explanation seems to be required.

Fig. 6 shows a variation. In certain cases the aligning hole 8 in the cylinder may be undesirable, and flush faces may be wanted on the valve without protruding bolt or dowel. Then the C-hole in the guard is threaded, with rotation opposite to the thread in the seat; the bolt 15 is provided with right and left hand threads, and the parts can be pulled together and secured in correct position by turning the bolt, applying a small screw driven on its slot. Gasket 16 is made thick enough to keep the faces of valve and port-hole bottom at an appropriate distance, so as to allow gas flow from port 8 into channel B, or vice versa, even if they are not aligned, and an undercut 19 insures communication between holes 11 and port 10 regardless of the angular position.

To prevent the plate from sticking to the guard and thus retarding the closing motion, the guard may be provided with a number of small grooves 14, whereby the area of contact between the two parts can be reduced to any desired amount.

The adapter need not be a separate piece, but can be integrated with the seat of the suction valve, and with the guard of the discharge valve respectively. Figure 6 shows a suction valve of this type; as can be seen by comparison with Figures 2 and 3, the guard 2 remains unchanged, but the seat 1 and the adapter 7 have been integrated into one single piece; the same can obviously be done with the discharge valve, in which case the seat will remain unchanged, but the guard 2 would be merged with the adapter 7 to form one piece, whose shape can easily be visualized from Figure 4. This reduces the number of parts and saves some machining, but suction and discharge valves become different and cannot longer be interchanged.

The valve may be installed on, and travel with, the piston of a reciprocating compressor; in this case the spring may be omitted entirely and, naturally, the spring well eliminated; or the spring well may even be recessed in the seat instead of in the guard, and the spring thus be given a tendency to open the valve instead of closing it, the closing motion being initiated by the inertia forces.

While the valve is primarily intended for use in reciprocating compressors, it may also be used where similar conditions prevail, for instance as a check valve in a pipe line.

I claim:

1. Automatic valve, primarily for reciprocating gas compressors, consisting of a seat, a guard, a plate, and a bolt, built and assembled in the following manner: a seat and guard member forming a valve body are aligned to each other by a peripheral recess on one of said seat and guard and a mating central recess on the other of said seat and guard in such a way that they face each other with two parallel planes at a right angle to their axes, the distance between which equals the thickness of the plate plus the plate lift; the plate is a flat disc with two parallel faces and on its periphery slidingly fitted into said central recess; the bolt is threaded on at least one end and has a cylindrical part at its middle; seat, guard, and plate bear holes parallel to the valve axis and of approximately equal size, whose center lines form the lateral edges of an approximately regular triangular prism and are in the following referred to as A, B, and C respectively; the seat has at location A a through hole, and at C a hole drilled to a certain depth, but not through, which at its open end fits closely the middle part of the bolt, and bears at its bottom a female thread mating with the male thread of the bolt; the plate has two holes through it, the first of which, at location C, engages the middle part of the bolt with a sliding fit, whereas the second hole is put at location B, and no hole at location A; the guard has a through hole at location C, which at least along a part of its length fits closely the middle part of the bolt, and another hole at location B; the bolt extending through the guard and plate and into the seat at location C, engages at one end with the thread in the seat and at its other end by suitable means with the guard, thus holding the parts together and securing them in their correct position relative to each other.

2. Valve as per claim 1, whose guard has a hole in axial direction, at least part of which is threaded, at location A.

3. Valve as per claim 1, comprising also a spring, housed and working in the following manner: one of the members that form the valve body, that is the seat and the guard, has a recess opening toward the other member and serving as a spring well; the spring is of the compression type and inserted into said well and, thus, interposed between one member and the plate, urges the latter towards the other member.

4. Valve as per claim 1, whose seat has at location B a hole, drilled from the side opposite to hole "C," but not through, which receives a dowel pin, which by engaging in a mating hole in another part of the compressor assembly locates the valve correctly.

5. Valve as per claim 1, whose bolt has a fillister head protruding from the outer face of the guard to engage in a mating hole in another part of the compressor assembly and thereby to locate the valve correctly.

6. Valve as per claim 1, whose aligning hole, at C location, in the guard is threaded also, and whose bolt is threaded on both ends, one mating the thread in the seat, the other that in the guard, both threads having opposite rotation.

7. Valve as per claim 1, whose guard has shallow grooves on its inner face, which reduce the contact area between plate and guard.

8. Adapter for valve as per claim 4, mating the seat on its outer face with a peripheral shoulder and having three holes in axial direction at locations A, B, and C, one of which fits said dowel pin, and one of which is aligned with the through hole in the seat, and having at least one opening on the periphery so located as to align with a port in the compressor body.

9. Adapter for valve as per claim 5, mating the guard on its outer face with a peripheral shoulder and having three holes in axial direction at locations A, B, and C, one of which fits said fillister head, and one of which is aligned with the through hole in the guard, and having at least one opening on the periphery so located as to align with a port in the compressor body.

References Cited in the file of this patent

UNITED STATES PATENTS

| | | |
|---|---|---|
| 713,294 | Ernst | Nov. 11, 1902 |
| 1,102,316 | Bayles | July 7, 1914 |
| 1,175,484 | Stokes | Mar. 14, 1916 |
| 2,005,954 | Petersen | June 25, 1935 |
| 2,487,120 | Ferguson | Nov. 8, 1949 |

FOREIGN PATENTS

| | | |
|---|---|---|
| 364,703 | Great Britain | Jan. 14, 1932 |